United States Patent [19]

Morita

[11] Patent Number: 5,109,225
[45] Date of Patent: Apr. 28, 1992

[54] COORDINATE READER WITH POINTER INCLINATION COMPENSATION

[75] Inventor: Yoshiyuki Morita, Tokyo, Japan

[73] Assignee: Seiko Instruments, Inc., Tokyo, Japan

[21] Appl. No.: 621,985

[22] Filed: Dec. 4, 1990

[30] Foreign Application Priority Data

Dec. 4, 1989 [JP] Japan ................... 1-315708

[51] Int. Cl.⁵ .............................. H03M 1/22
[52] U.S. Cl. ........................... 341/5; 341/7; 178/18
[58] Field of Search ............ 341/5, 6, 7, 8, 15; 178/18, 19

[56] References Cited

U.S. PATENT DOCUMENTS

| | | | |
|---|---|---|---|
| 4,477,877 | 10/1984 | Nakamura et al. | 178/19 X |
| 4,577,057 | 3/1986 | Blesser | 178/18 |
| 4,700,022 | 10/1987 | Salvador et al. | 341/158 X |
| 4,710,595 | 12/1987 | Kimura | 178/18 |
| 4,717,793 | 1/1988 | Kobayashi | 178/18 |
| 4,818,851 | 4/1989 | Kimura | 178/19 X |
| 4,939,318 | 7/1990 | Watson et al. | 178/19 |

FOREIGN PATENT DOCUMENTS

| | | | |
|---|---|---|---|
| 52-30126 | 7/1977 | Japan | 178/19 |
| 55-99683 | 7/1980 | Japan | 178/18 |
| 56-108182 | 8/1981 | Japan . | |
| 59-202577 | 11/1984 | Japan | 178/18 |
| 63-70326 | 3/1988 | Japan . | |

Primary Examiner—Howard L. Williams
Attorney, Agent, or Firm—Spensley Horn Jubas & Lubitz

[57] ABSTRACT

An electromagnetic induction type coordinate reader composed of a main peak signal group detecting circuit for detecting a group of main peak signals out of induced signals which include a maximum-amplitude main peak signal, are close to one another, and are of the same phase; first and second secondary peak detecting circuits for detecting first and second secondary peak signals present before and after the group of main peak signals which are opposite in phase to the maximum-amplitude main peak signal and are taking maximal values of the induced signals; a main peak signal group adding circuit for obtaining the sum of amplitude of the group of main peak signals; a secondary peak subtracting circuit for obtaining the difference between the first and second secondary peaks; an inclination information calculating circuit for dividing the difference of the secondary peaks by the sum of amplitude of the group of main peak signals to deliver the inclination information of a coordinate pointer; and an inclination correcting circuit for correcting a coordinate value in terms of inclination error on the basis of the inclination information.

2 Claims, 6 Drawing Sheets

FIG. 2
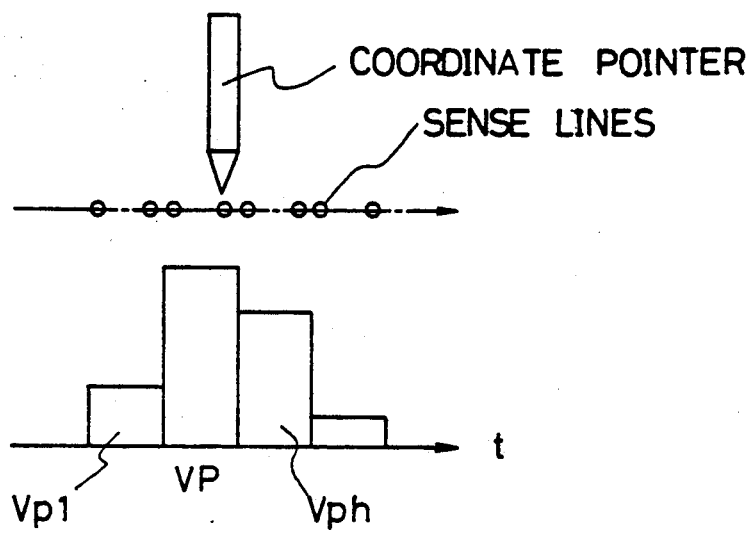
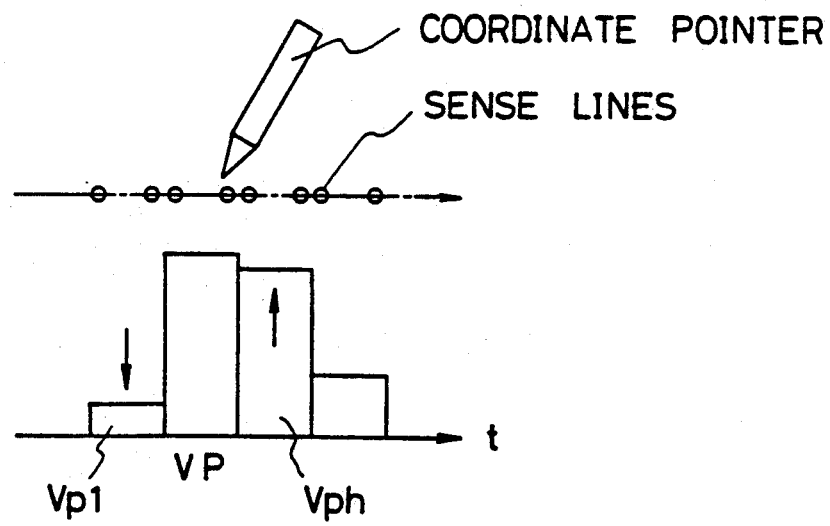
FIG. 3

FIRST SECONDARY = SECOND SECONDARY
PEAK SIGNAL     PEAK SIGNAL

FIRST SECONDARY < SECOND SECONDARY
PEAK SIGNAL     PEAK SIGNAL

COORDINATE READER WITH POINTER INCLINATION COMPENSATION

BACKGROUND OF THE INVENTION

This invention relates to a coordinate reader for delivering coordinate information to a central device such as a computer, and more particularly to a coordinate reader of the electromagnetic induction type in which coordinate information is produced by electromagnetic induction.

Generally, a coordinate is obtained by successively scanning sense lines close to the current position of a coordinate pointer to detect induced signals induced in these sense lines and by subjecting such induced signals to comparison/calculation processing.

FIG. 2 shows the amplitude of several induced signals on a time base. VP is a maximum-amplitude main peak signal; thus, the coordinate pointer is laid in the vicinity of the sense line delivering the maximum-amplitude main peak signal. Generally, the spacing between adjacent sense lines is larger than the degree of resolution required for a coordinate value; therefore, a more accurate position of the coordinate pointer between adjacent sense lines is obtained by subjecting VP, and Vpl and Vph which are the signals on the sense lines preceding and subsequent to VP to comparison/calculation processing.

In the example of FIG. 2, Vph > Vpl, and the coordinate pointer is displaced from the sense line having the induced voltage VP in the scanning direction (toward the sense line having the induced voltage Vph). The coordinate value is obtained with a given degree of resolution of, for example, 0.1 mm by processing the signals Vp, Vpl and Vph.

SUMMARY OF THE INVENTION

The present invention concerns a coordinate reader of the electromagnetic induction type in which a coordinate value is obtained by processing the amplitude of each induced signal which is induced in each sense line by virtue of the electromagnetic induction action between a coordinate pointer and sense lines.

It is an object of the present invention to provide a coordinate reader capable of removing an inclination error from a coordinate value that arises when a coordinate pointer is laid on sense lines in an inclined position, or orientation.

The above and other objects are achieved, according to the present invention, by an electromagnetic induction type coordinate reader composed of a main peak signal group detecting circuit for detecting a group of main peak signals out of a plurality of induced signals which include a maximum-amplitude main peak signal, which are close to one another, and are of the same phase; first and second secondary peak detecting circuits for detecting first and second secondary peak signals present before and after the group of main peak signals which are opposite in phase to the maximum-amplitude main peak signal and are taking maximal values of the induced signals; a main peak signal group adding circuit for obtaining the sum of amplitude of the group of main peak signals; a secondary peak subtracting circuit for obtaining the difference between the first and second secondary peaks; an inclination information calculating circuit for dividing the difference of the secondary peaks by the sum of amplitude of the group of main peak signals to deliver inclination information of a coordinate pointer; and an inclination correcting circuit for correcting a coordinate value in terms of inclination error on the basis of the inclination information.

FIG. 3 shows the amplitude of each induced signal on a time base (similarly to FIG. 2) where the coordinate pointer is inclined. The coordinate pointer is illustrated in the form of a stylus pen, its point occupying the same position as in FIG. 2. The direction of inclination corresponds with the direction of scanning the sense lines. As illustrated in FIG. 3, an induced voltage Vph on the side where the pen is inclined becomes larger, and another induced voltage Vpl on the opposite side becomes smaller, as compared with the values occurring with the pen inclination of FIG. 2. Therefore, the coordinate value shifts in the direction of inclination of the pen.

To overcome difficulties created by such induced voltage variation, the present invention detects the inclination information of the coordinate pointer and corrects the coordinate value in dependence on inclination error, thereby attaining correct coordinate reading even when the inclination of the coordinate pointer changes.

BRIEF DESCRIPTION OF THE DRAWING

FIG. 2 is a diagram illustrating induced signals.

FIG. 3 is a diagram illustrating induced signals when a coordinate pointer is inclined.

DESCRIPTION OF THE PREFERRED EMBODIMENTS

Figure 1:
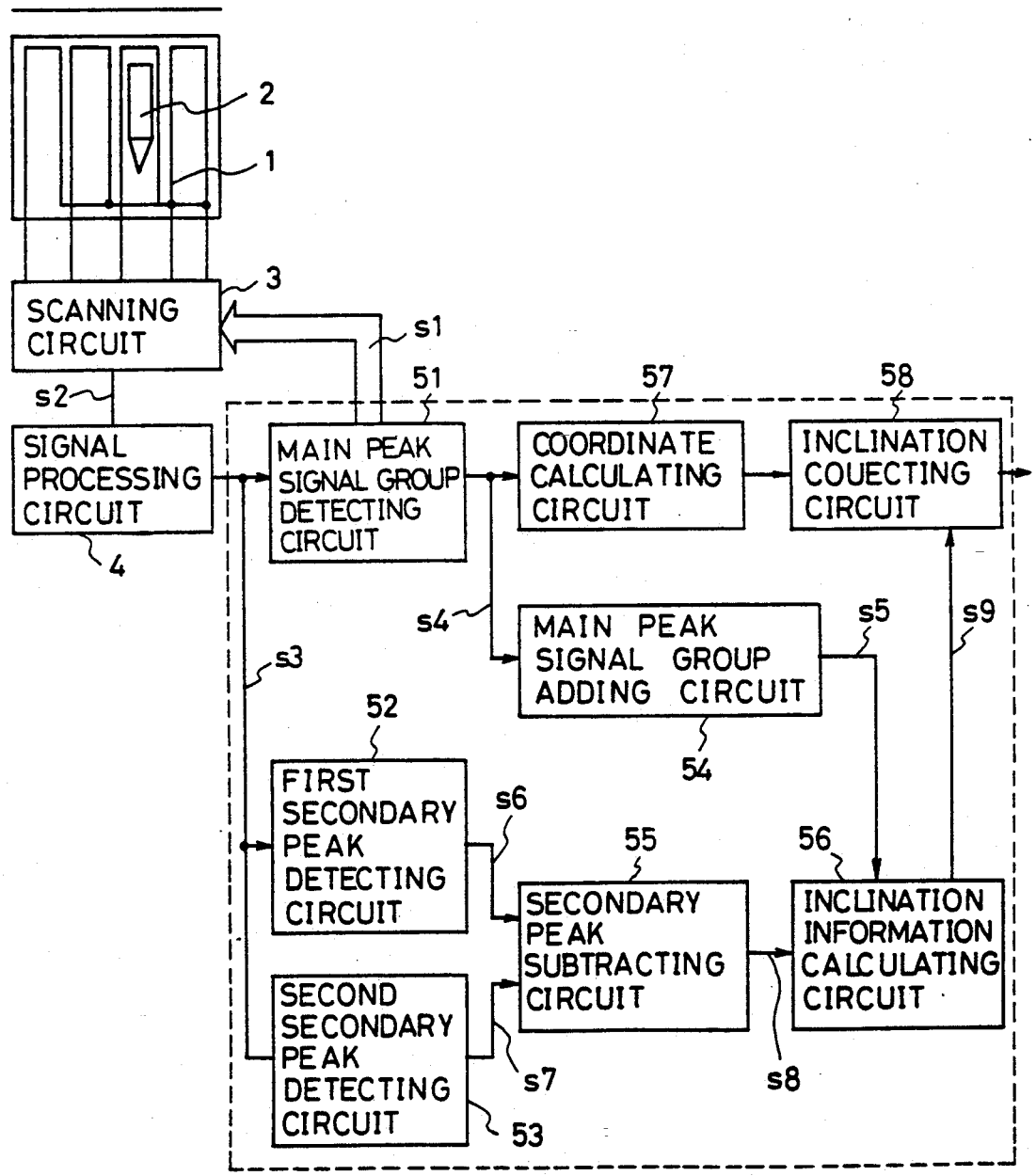
FIG. 1 is a block diagram of a coordinate reader according to the present invention.

FIG. 1 shows in block form a coordinate reader according to the present invention. The reader includes a group of sense lines 1, a coordinate pointer 2, a scanning circuit 3, a signal processing circuit 4, and a control circuit 5.

Control circuit 5 is composed of a main peak signal group detecting circuit 51, a first secondary peak detecting circuit 52, a second secondary peak detecting circuit 53, a main peak signal group adding circuit 54, a secondary peak subtracting circuit 55, an inclination information calculating circuit 56, a coordinate calculating circuit 57, and an inclination correcting circuit 58.

FIG. 1 shows only one group of sense lines which is effective when the direction of coordinate detection is horizontal. If two groups of sense lines perpendicular to each other are provided, two coordinate values and corresponding inclination information in an X-Y rectangular coordinate system can be obtained. Since the operation with respect to one of the two coordinate axes is identical with that of the other, the following description will be given with respect to one axis alone.

The Operation of Reading Induced Signals

In FIG. 1, the control circuit 5 applies a scan signal s1 to the scanning circuit 3. Upon receipt of the scan signal, the scanning circuit 3 successively scans the sense lines 1. The coordinate pointer 2 is laid on the sense lines 1.

The coordinate pointer 2 includes a coil to generate an ac magnetic field. Although there are known various methods of exciting a coil, the preferred embodiment uses an oscillator and an amplifier (not shown) for excitation purposes. Other methods will be described later.

In response to the scan signal s1, the scanning circuit 3 successively detects induced signals s2 induced in the sense lines 1. The signal processing circuit 4 transforms each induced signal s2 into an envelope signal s3.

Figure 4:
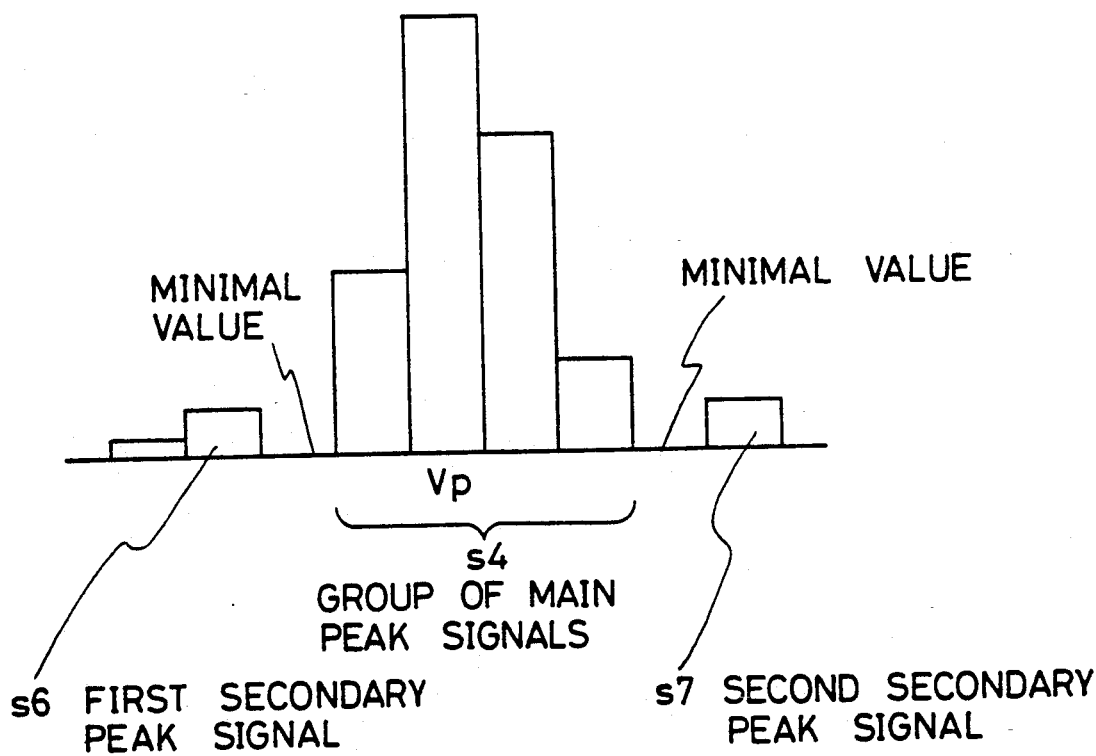
FIG. 4 is a diagram illustrating a distribution of induced signals.

FIG. 4 shows a distribution of such induced signals after transformation into envelope signals s3. This drawing shows that the induced signals s2 are successively generated with scanning, or as a function of time, and that the induced signals correspond to the sense lines. The distribution of induced signals is such that the amplitude of each induced signal becomes larger as the corresponding sense line becomes closer to the current position of the coordinate pointer, becomes smaller as it becomes closer to either peripheral zone (around a central group of sense lines), and takes a maximal value in such a peripheral zone. The reason why the induced signal of the sense line in the peripheral zone takes a maximal value is because a magnetic field opposite in phase to the magnetic field providing the central maximum-amplitude induced signal acts to induce such a maximal induced signal.

Operation of the Main Peak Signal Group Detecting Circuit 51 and the Main Peak Signal Group Adding Circuit 54

The main peak signal group detecting circuit 51 detects a main peak signal VP of maximum amplitude out of the envelope signals s3 and then a group of main peak signals s4 contiguously surrounding the signal VP and having the same phase as the signal VP. In practice, if minimal values present before and after the signal VP are detected, a group of signals lying between the two minimal values is considered as the group of main peak signals s4 (see FIG. 4). In this way, the main peak signal group detecting circuit 51 detects the group of main peak signals s4. Of course, the group of main peak signals can be detected by performing detection/comparison processing in terms of phase.

The main peak signals s4 detected by the main peak signal group detecting circuit 51 are added together by the main peak signal group adding circuit 54, whereby main peak sum information s5 is obtained.

The Operation of the First and Second Secondary Peak Detecting Circuits 52 and 53

As shown in FIG. 4, secondary peaks belong to the signals of maximal value present before and after the group of main peak signals s4.

The first secondary peak detecting circuit 52 detects a maximal value in the region from the start position of scanning to the position of a minimal value present before the group of main peak signals, a signal corresponding to the maximal value thus detected being referred to as a first secondary peak signal s6.

Similarly, the second secondary peak detecting circuit 53 detects a maximal value in the region from the position of a minimal value present after the group of main peak signals to the end position of scanning, a signal corresponding to the maximal value thus detected being referred to as a second secondary peak signal s7.

The Operation of the Secondary Peak Subtracting Circuit 55

The first and second secondary peaks detected by the first and second secondary peak detecting circuits are applied to the secondary peak subtracting circuit 55 in which the difference between these secondary peaks is obtained, this being referred to as secondary peak difference information s8.

Figure 5A:
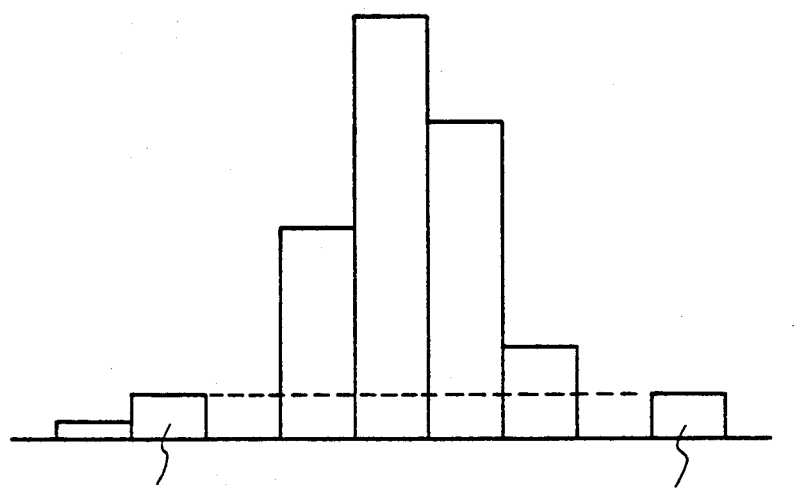
FIG. 5(a) is a diagram illustrating a distribution of induced signals where the coordinate pointer has no inclination.

FIG. 5(a) shows a distribution of induced signals where the coordinate pointer has no inclination. When the coordinate pointer has no inclination, the first and second secondary peaks are identical in magnitude, and the difference between them is zero; therefore, the secondary peak difference information is zero.

Figure 5B:
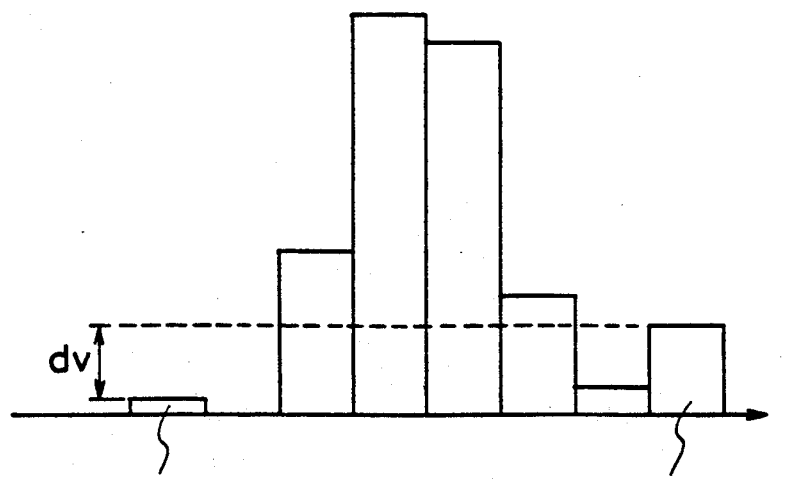
FIG. 5(b) is a diagram illustrating a distribution of induced signals where the coordinate pointer is inclined in the scanning direction.

FIG. 5(b) shows a distribution of induced signals where the coordinate pointer is inclined in the scanning direction. In this case, (the first secondary peak)<(the second secondary peak); therefore, the difference between them is given by $$(\text{the first secondary peak}) - (\text{the second secondary peak}) = -d_y \quad (1)$$

The algebraic sign of the calculation result shown above indicates the direction of inclination. In this example, the calculation result is negative, indicating that the coordinate pointer is inclining in the scanning direction. The magnitude of $d_y$ represents the magnitude of inclination.

The Operation of the Inclination Information Calculating Circuit 56

With the foregoing processing alone, the value of $d_y$ fluctuates depending on the mean magnitude of the induced signals.

Figure 6A:
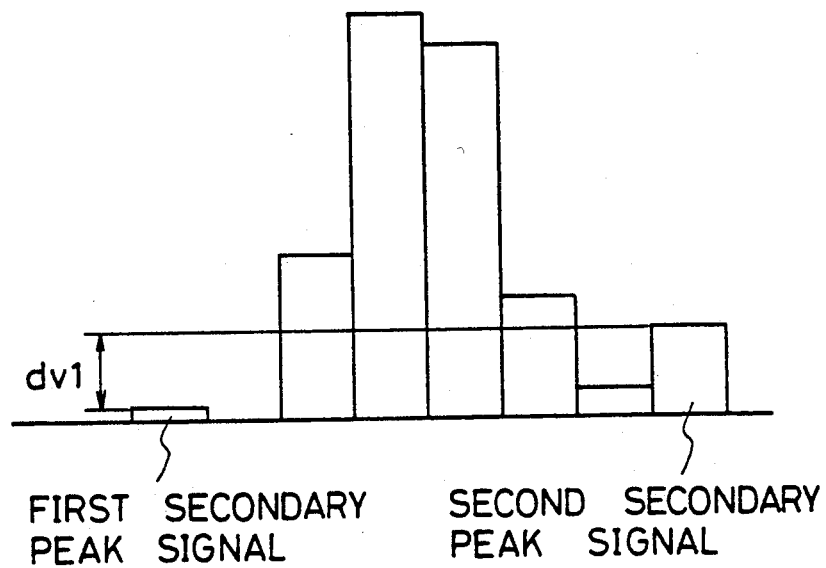
FIG. 6(a) is a diagram illustrating a distribution of induced signals where the coordinate pointer is close to sense lines.
Figure 6B:
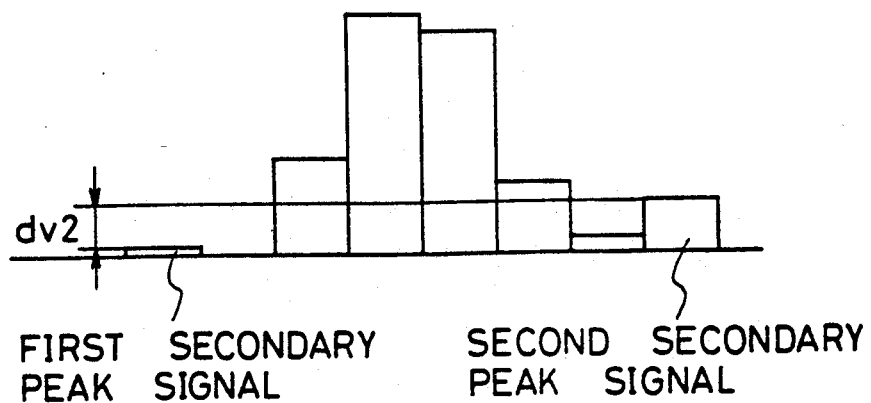
FIG. 6(b) is a diagram illustrating a distribution of induced signals where the coordinate pointer is remote from sense lines.

FIG. 6(a) shows a distribution of induced voltages where the coordinate pointer is close to the sense lines, whereas FIG. 6(b) shows such a distribution where the coordinate pointer is remote from the sense lines. In these drawings, the position of the coordinate pointer in its detecting direction is the same but, apparently, $d_{y1} > d_{y2}$; therefore, $d_{y1}$ and $d_{y2}$ cannot be used to provide inclination information.

From experiments, it has been found that the main peak sum information s5 obtained in the foregoing manner represents the mean magnitude of the induced signals. The inclination information calculating circuit 56 divides the secondary peak difference information by the main peak sum information. The calculation result is referred to as inclination information s9 which is independent of the mean magnitude of the induced signals.

The Operation of the Inclination Correcting Circuit 58

The coordinate calculating circuit 57 calculates a coordinate value. However, the calculated coordinate value includes an inclination error pertaining to the coordinate pointer as described above.

The inclination correcting circuit 58 receives the inclination information s9 and corrects the coordinate value. It has been confirmed from experiments that when the angle of inclination $\theta$ of the coordinate pointer is within a range of $0 \leq \theta \leq 40$ degrees, the inclination information s9 is substantially proportional to the angle of inclination. On the basis of the foregoing finding, the inclination correcting circuit 58 attains inclination correction by performing the following calculation:

$$c-cd = cd + (s-d_v \times \text{const}) \qquad (2)$$

where c−cd is the coordinate value after correction, cd is the coordinate value before correction, $s-d_v$ is the inclination information (value with sign corresponding to the answer of expression (1)), and const is the correction coefficient used in transforming $s-d_v$ into a correction value.

Application to Other Coordinate Readers of the Electromagnetic Induction Type

Although the foregoing embodiment uses a coordinate pointer connected with an oscillator and an amplifier and obtains the coordinate value from the induced signals induced in the sense lines by virtue of the magnetic field generated by the coordinate pointer, the inclination correcting process according to the present invention can be applied also to other coordinate readers of the electromagnetic induction type.

Figure 7:
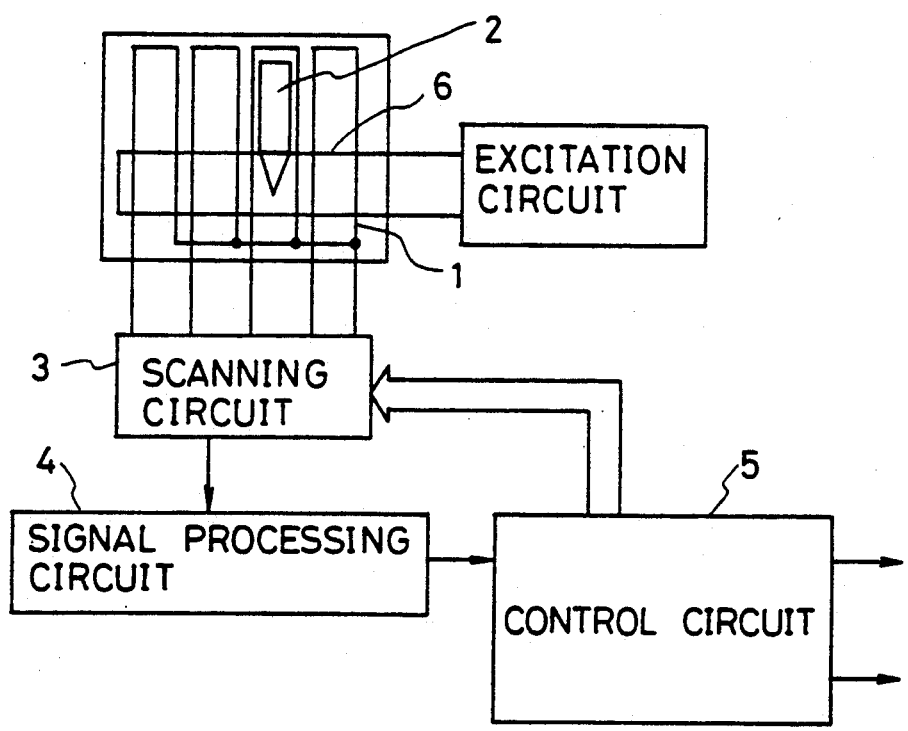
FIG. 7 is a block diagram of a modified coordinate reader according to the present invention.

For example, FIG. 7 shows in block form a coordinate reader in accordance with the present invention which is characterized in that sense lines are arranged in the X- and Y-directions, with one group of sense lines being excited, and a coordinate pointer includes a resonance circuit, and when the coordinate pointer is laid on the sense lines, electromagnetic induction takes place from the excited sense lines to the sense lines under detection. In this reader, since the distribution of induced signals on the sense lines under detection is identical with that of the preferred embodiment described above, the inclination correcting process can be applied similarly.

Further, Japanese Patent Laid-Open No. 63-70326 discloses a position detecting device which is characterized in that sense lines are temporarily excited, energy is stored in a resonance circuit of a coordinate pointer, and a coordinate value is obtained from a distribution of induced signals induced in the same sense lines as above after excitation is terminated. In this device, the inclination correcting process can be applied similarly.

In the electromagnetic induction type coordinate reader, the essential process of the present invention is to detect the secondary peaks from the induced signals obtained by scanning the sense lines, calculate the inclination information from the these signals, and perform inclination correction. Therefore, besides the system wherein the induced signals are generated in the sense lines, the present invention can be applied to any system.

As described above, in the electromagnetic induction type coordinate reader according to the present invention, the group of main peak signals is detected out of the induced signals, the secondary peak signals present before and after the group of main peak signals are detected, the difference between the secondary peak signals is divided by the sum of the group of main peak signals to obtain the inclination information of the coordinate pointer that is independent of the mean magnitude of the induced signals, and the coordinate value is corrected in terms of inclination on the basis of the inclination information. Therefore, the coordinate can be accurately read irrespective of the inclination of the coordinate pointer.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a coordinate reader comprising a plurality of groups of sense lines arranged in parallel at equal intervals and extending transversely to a coordinate detection direction, a coordinate pointer arranged to interact with the sense lines for causing induced signals to be generated in the sense lines by an electromagnetic induction action related to the position of the pointer relative to the coordinate detection direction, a scanning circuit connected for successively scanning the sense lines, a signal processing circuit connected with the scanning circuit for processing the induced signals induced in the sense lines, and a control circuit connected to the scanning circuit and the signal processing circuit for controlling the scanning circuit, for successively receiving from the signal processing circuit the signals induced in the individual sense lines, and for processing the amplitude of each of the induced signals to obtain an indication of the value of the coordinate corresponding to the position of the coordinate pointer, the induced signals each being present on a respective sense line and including, for each position of the pointer, a maximum-amplitude main peak signal and a group of main peak signals contiguously surrounding the maximum-amplitude main peak signal and having the same phase as that of the maximum-amplitude main peak signal, a first secondary peak signal present on a line ahead of the lines supplying the group of main peak signals, the first secondary peak signal being opposite in phase to the group of main peak signals and having a first maximal signal value, and a second secondary peak signal present on a line following the lines supplying the group of main peak signals, the second secondary peak signal being opposite in phase to the group of main peak signals and having a second maximal value, improvement wherein said control circuit comprises:

a coordinate calculating circuit for obtaining a coordinate value, a main peak signal group detecting circuit connected for detecting, out of the induced signals, the maximum-amplitude main peak signal and the group of main peak signals contiguously surrounding the maximum-amplitude main peak signal;

a first secondary peak detecting circuit connected for detecting the first secondary peak signal;

a second secondary peak detecting circuit connected for detecting the second secondary peak signal;

a main peak signal group adding circuit for obtaining the sum of amplitudes of the group of main peak signals;

a secondary peak subtracting circuit for obtaining the difference between the first and second secondary peak signals;

an inclination information calculating circuit for dividing the difference of the secondary peak signals by the sum of amplitude of the group of main peak signals to provide a signal representing the inclination of the coordinate pointer in the coordinate detecting direction; and an inclination correcting circuit for correcting the coordinate value obtained by said coordinate calculating circuit on the basis of the inclination signal provided by said inclination information calculating circuit.

2. A coordinate reader comprising a plurality of groups of sense lines arranged in parallel at equal intervals in the X-direction and in the Y-direction of an X-Y rectangular coordinate system, a coordinate pointer laid on the sense lines for causing induced signals to be generated in the sense lines by an electromagnetic induction action, an X scanning circuit and a Y scanning circuit for successively scanning the sense lines, a signal processing circuit connected to the X scanning circuit and the Y scanning circuit for processing the signals induced in the sense lines, and a control circuit for controlling the X scanning circuit and the Y scanning circuit, for successively receiving the induced signals induced in the individual sense lines from the signal processing circuit, and for processing the amplitude of each of the induced signals in each of the X-direction and the Y-direction to obtain an X coordinate value indication and a Y coordinate value indication corresponding to the position of the coordinate pointer, the induced signals each being present on a respective sense line and including, for each direction of the coordinate system and for each position of the pointer, a maximum-amplitude main peak signal and a group of main peak signals contiguously surrounding the maximum-amplitude main peak signal and having the same phase as that of the maximum-amplitude main peak signal, a first secondary peak signal present on a line ahead of the lines supplying the group of main peak signals, the first secondary peak signal being opposite in phase to the group of main peak signals and having a first maximal signal value, and a second secondary peak signal present on a line following the lines supplying the group of main peak signals, the second secondary peak signal being opposite in phase to the group of main peak signals and having a second maximal value, improvement wherein, for each direction of the coordinate system, said control circuit comprises:

a coordinate calculating circuit for obtaining a coordinate value;

a main peak signal group detecting connected circuit for detecting, out of the induced signals, the maximum-amplitude main peak signal and the group of main peak signals contiguously surrounding the maximum-amplitude main peak signal;

a first secondary peak detecting circuit for detecting the first secondary peak signal;

a second secondary peak detecting circuit for detecting the second secondary peak signal;

a main peak signal group adding circuit for obtaining the sum of amplitude of the group of main peak signals;

a secondary peak subtracting circuit for obtaining the difference between the first and second secondary peak signals;

an inclination information calculating circuit connected for dividing the difference of the secondary peak signals by the sum of amplitude of the group of main peak signals to provide a signal representing the inclination of the coordinate pointer in the coordinate detecting direction with respect to the associated coordinate direction; and an inclination correcting circuit connected for correcting the coordinate value for the associated coordinate direction obtained by said coordinate calculating circuit on the basis of the inclination signal provided by said inclination information calculating circuit.

* * * * *